UNITED STATES PATENT OFFICE.

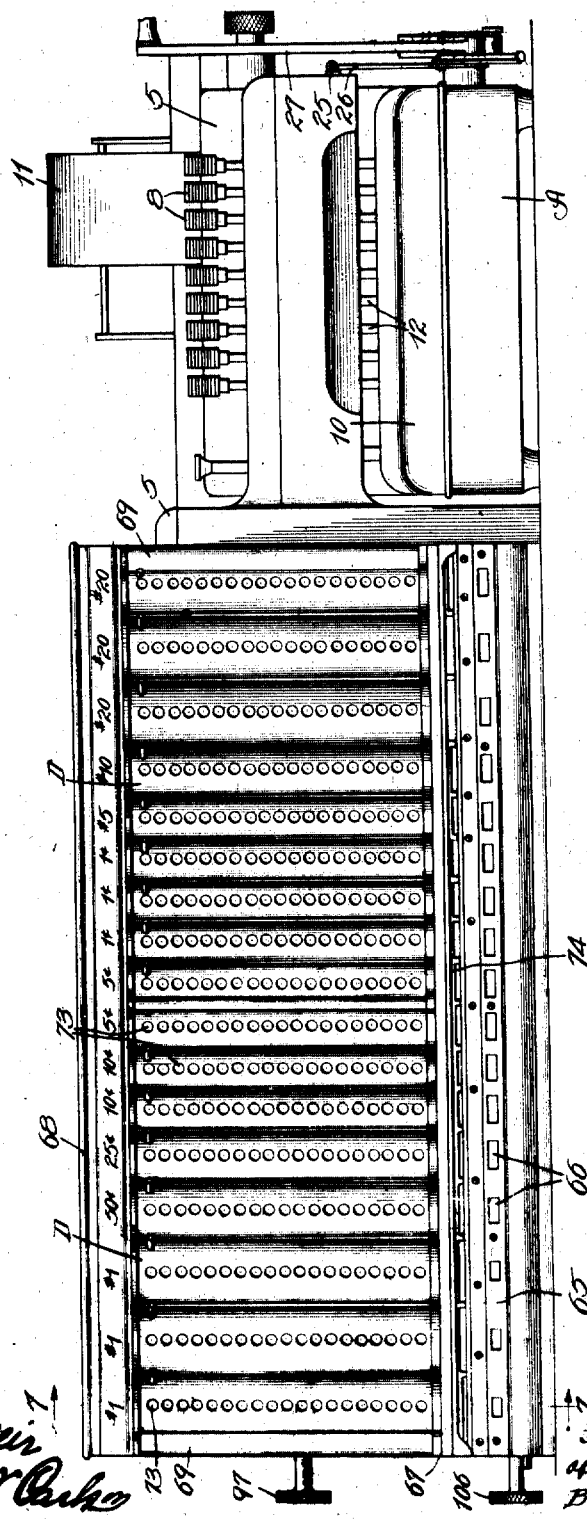

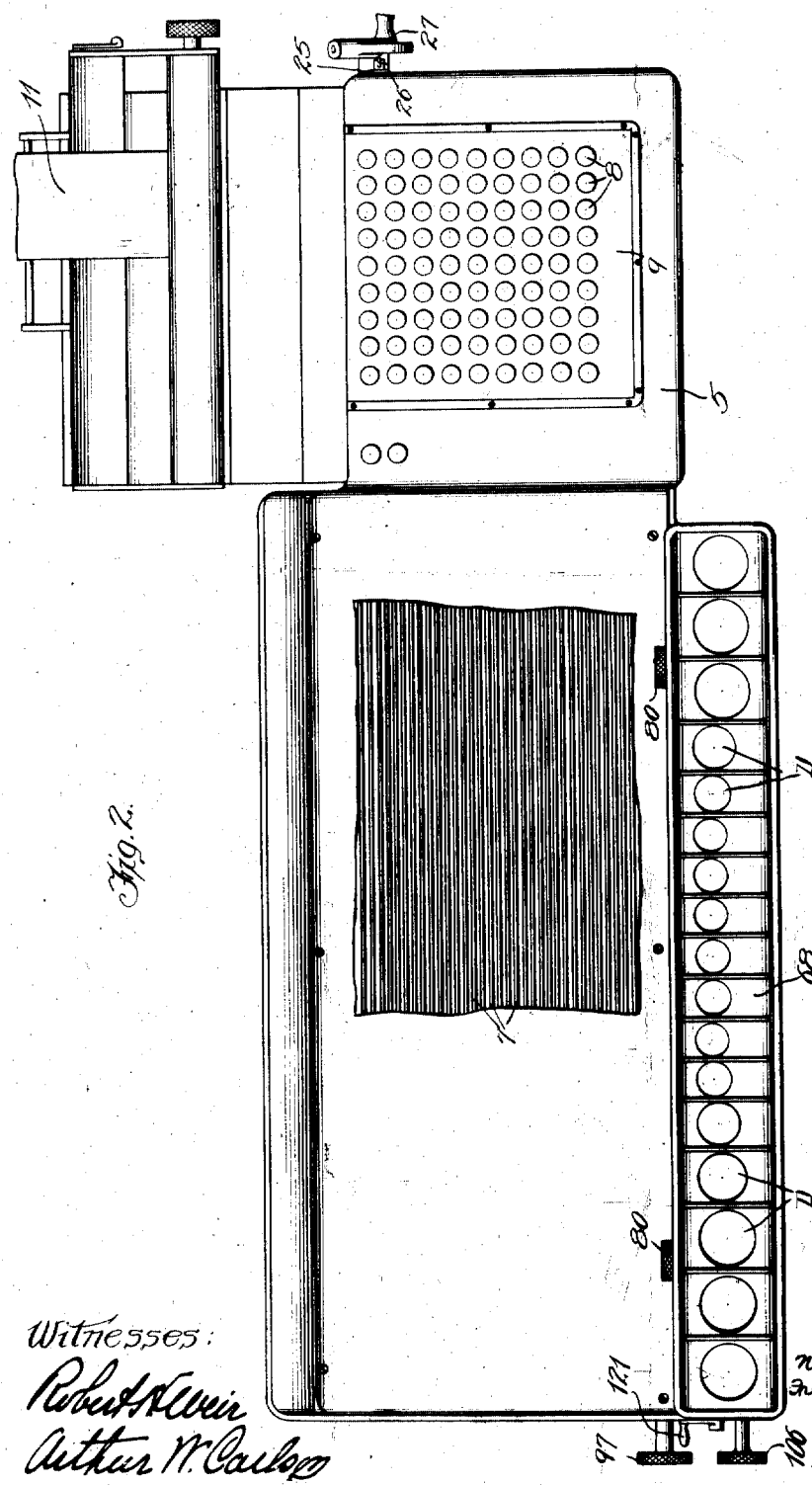

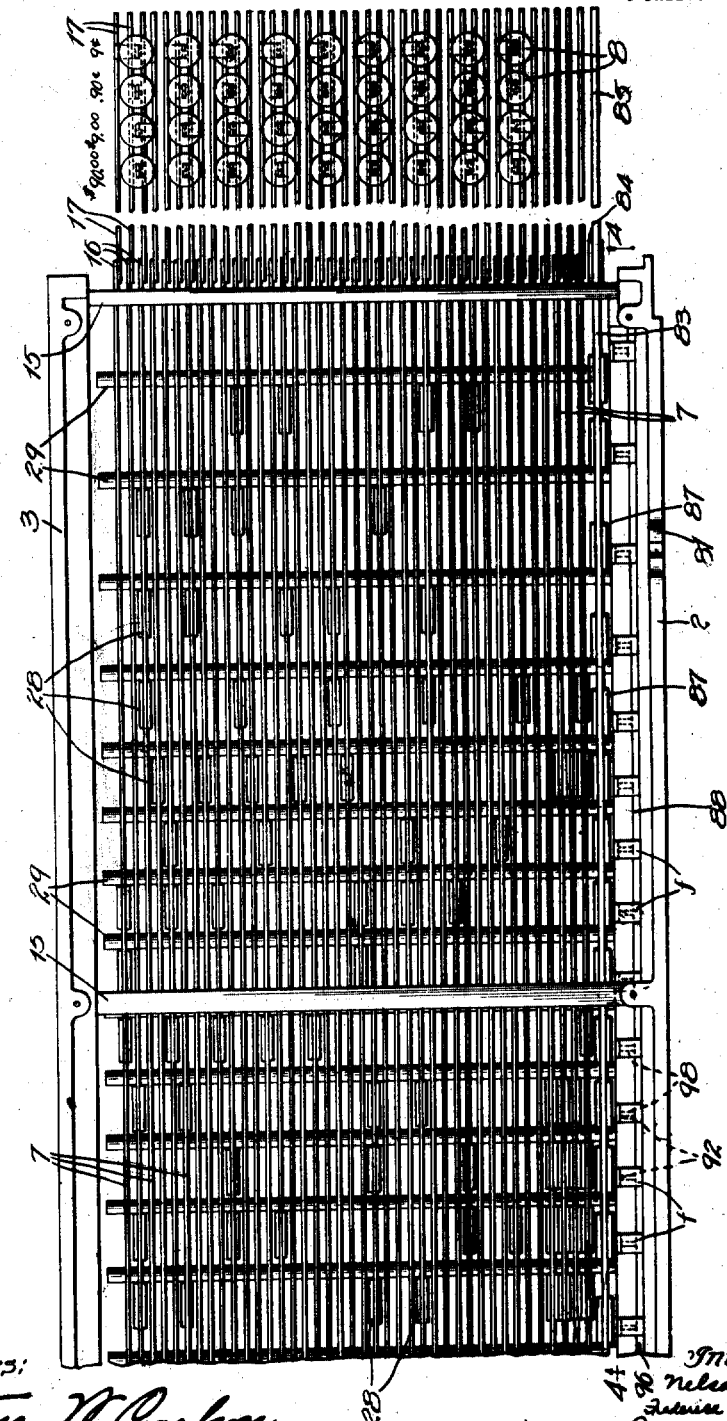

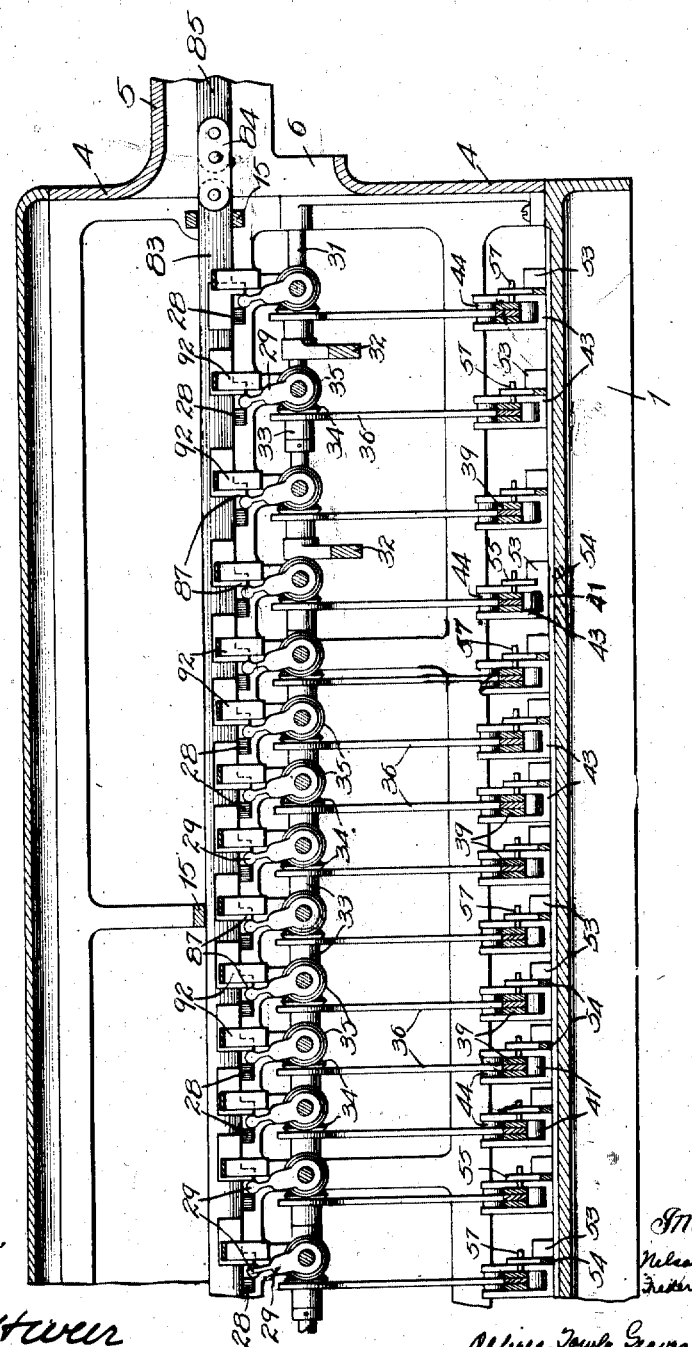

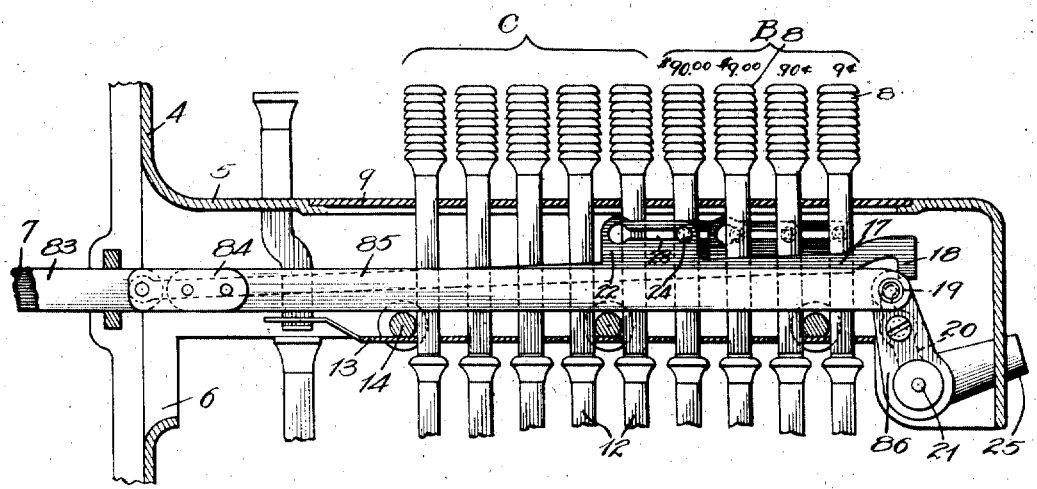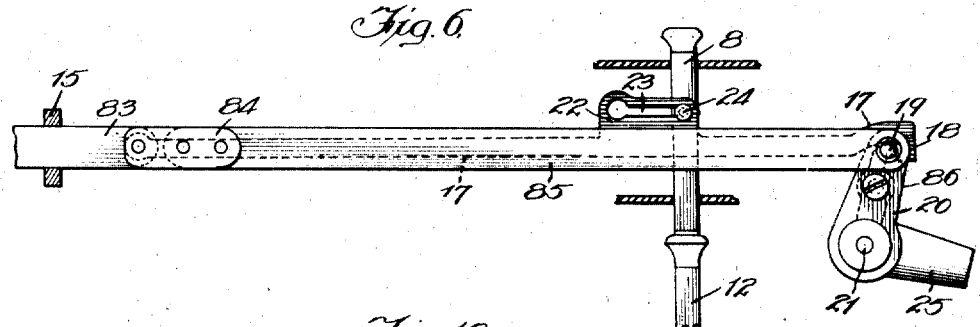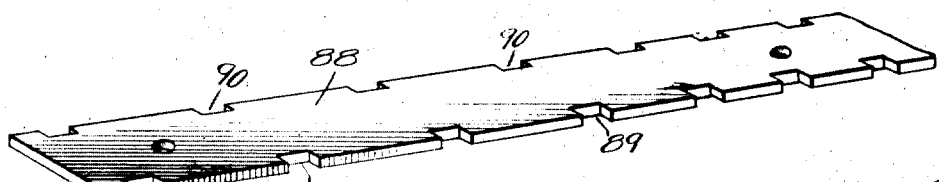

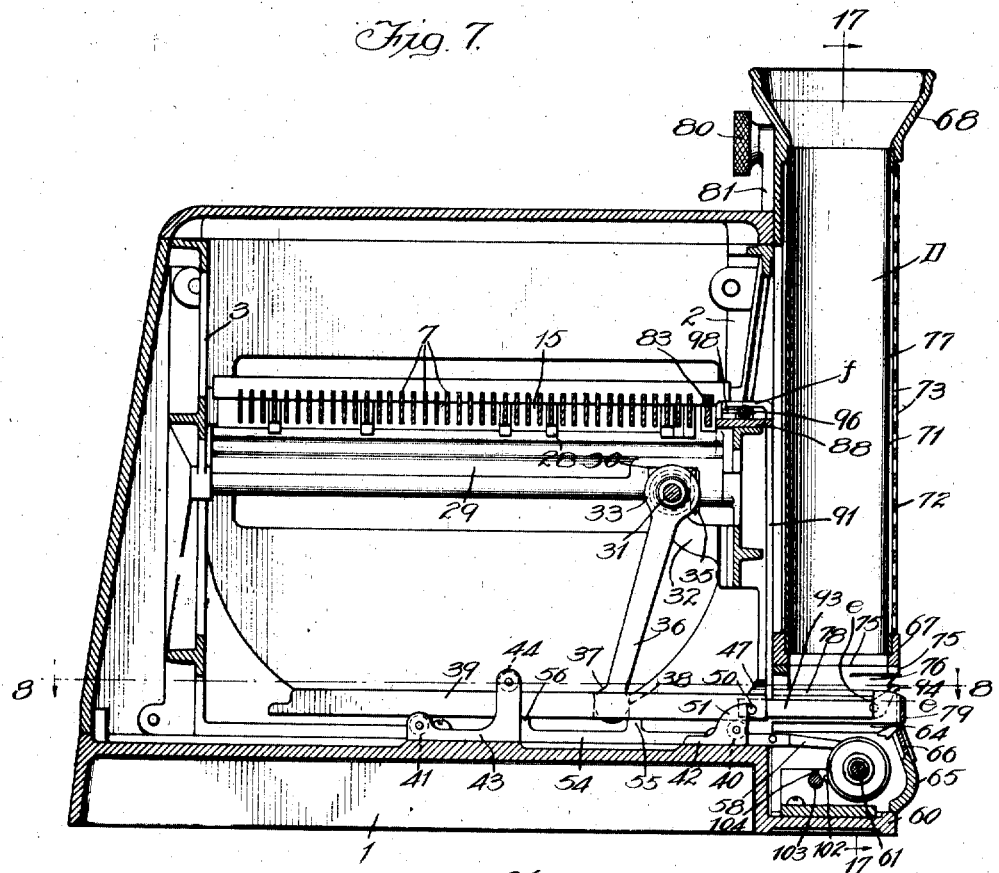
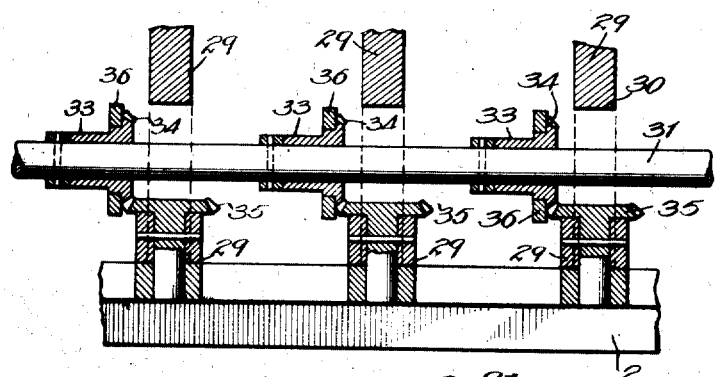
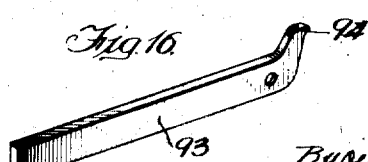

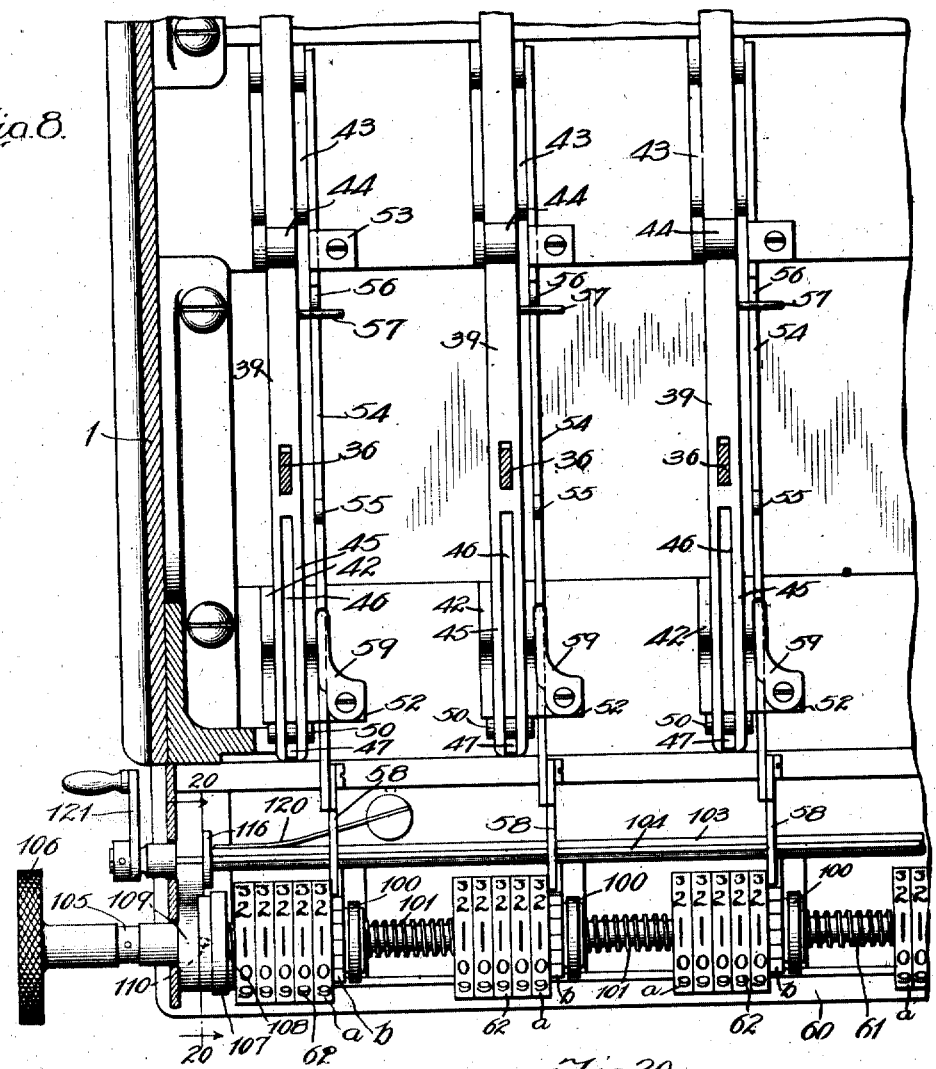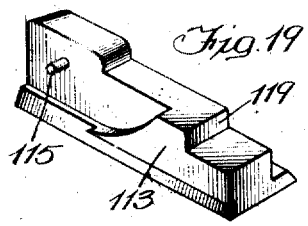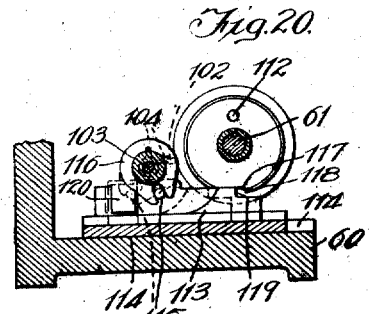

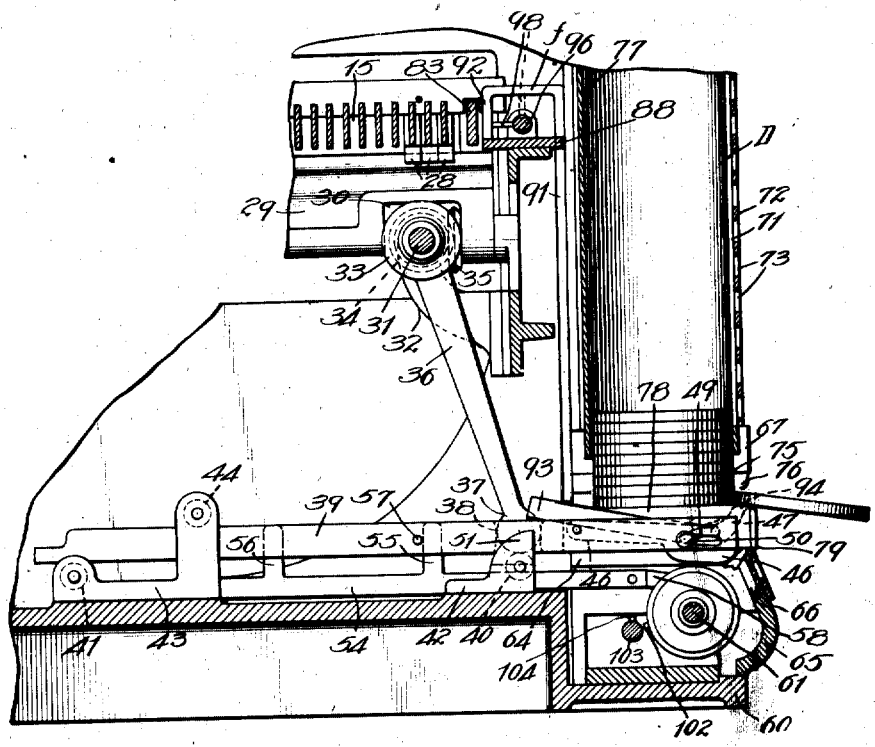
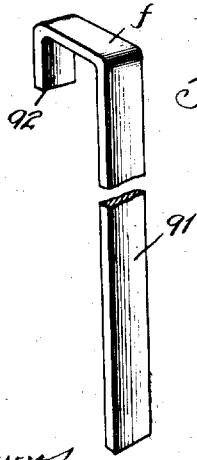
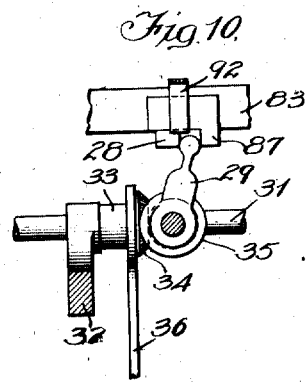
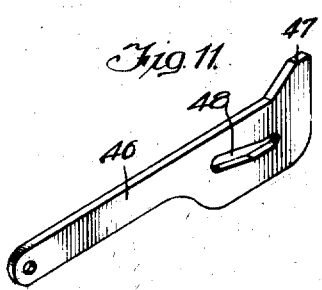

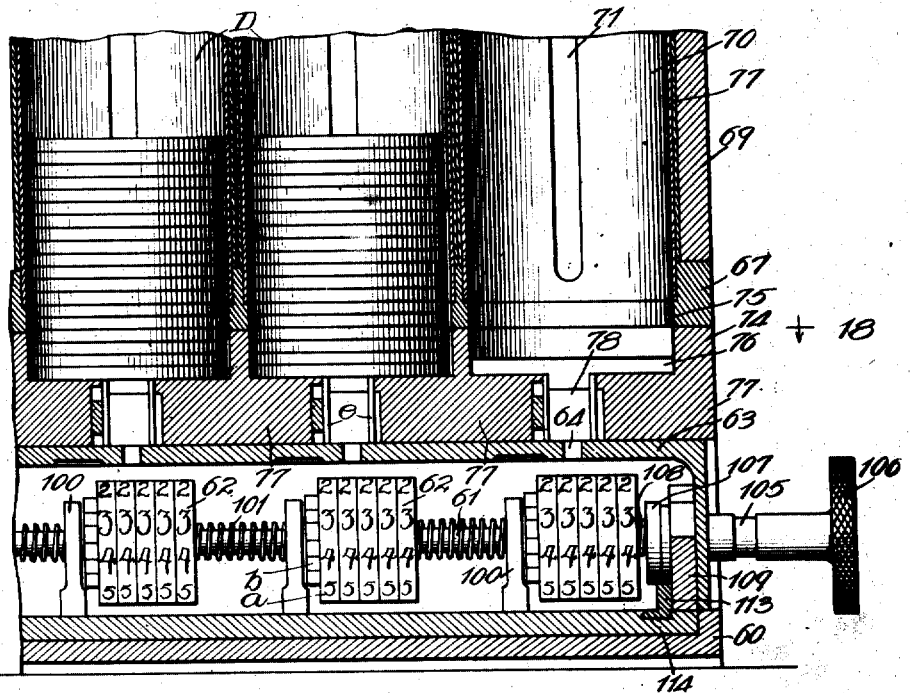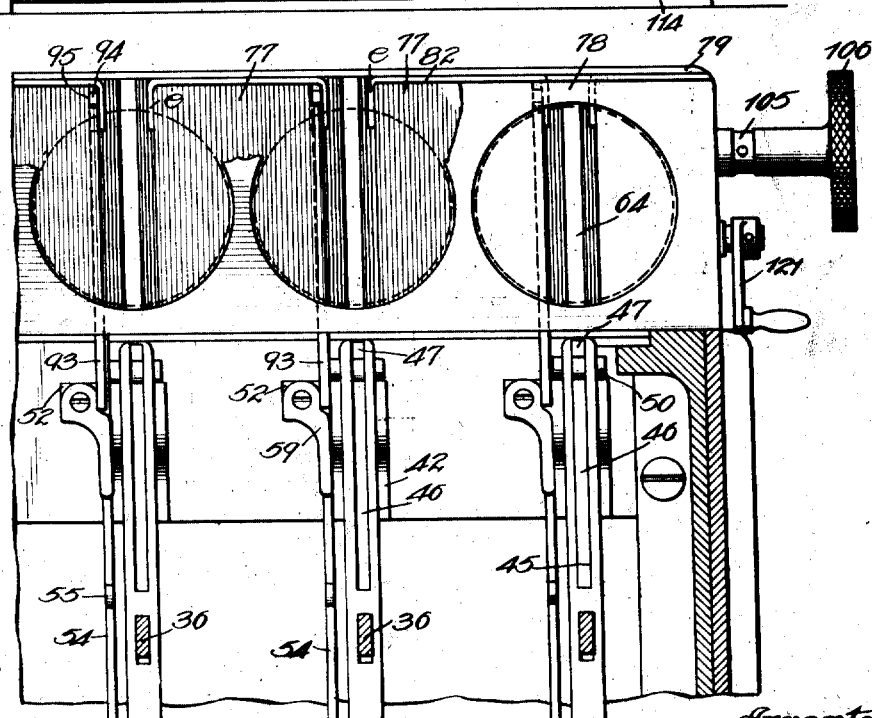

NELSON C. OVAITT AND FREDRICK N. ROSENSTENGEL, OF DETROIT, MICHIGAN, ASSIGNORS TO PAYOGRAPH COMPANY, OF DETROIT, MICHIGAN, A CORPORATION OF MICHIGAN.

PAYING-MACHINE.

1,213,532.  Specification of Letters Patent.  Patented Jan. 23, 1917.

Application filed November 17, 1914. Serial No. 872,624.

*To all whom it may concern:*

Be it known that we, NELSON C. OVAITT and FREDRICK N. ROSENSTENGEL, both citizens of the United States, and residents of Detroit, in the county of Wayne and State of Michigan, have invented certain new and useful Improvements in Paying-Machines, of which the following is a specification.

Our invention relates to paying and recording machines particularly to that class comprising coin holding mechanism and key-board mechanism associated to coöperate therewith.

Among the important objects of the invention are to simplify and improve the constructions and operations of the various elements to produce greater efficiency; to provide improved locking mechanism which is automatically controlled by the ejection of coins from the magazine compartments to permit operation of the machine but which becomes effective to automatically lock the machine against further operation as soon as attempt is made to eject from an empty magazine compartment; to provide improved ejector members for efficiently engaging with and ejecting coins during forward stroke but adapted to be entirely free from the coins during restoring movement; to provide improved counter mechanism built into the machine and controlled during forward movement of the selector members to indicate and to accumulate the amounts ejected; to provide improved means for readily unlocking the machine for operation when the coin magazines are empty whereby the counter mechanisms may be operated to determine the numbers of coins of different denominations necessary for meeting certain sums; to provide improved and simplified means for setting back and restoring the counter mechanisms to zero indication; and in general to provide an improved and simplified and more efficient machine of the character referred to.

The various features of the invention will be readily understood by referring to the accompanying drawings in which—

Figure 1 is a front elevational view, Fig. 2 is a plan view, Fig. 3 is an enlarged plan view showing particularly the arrangement of the selector bars and latch bars, Fig. 4 is a sectional view on plane 4—4, Fig. 3, Fig. 5 is a front elevational view of a paying machine key-board with the housing thereof in section; Fig. 6 is an elevational view of the keys and latching bars associated therewith, showing the latching bars in latching position; Fig. 7 is an enlarged sectional view taken substantially on plane 7—7, Fig. 1, Fig. 8 is an enlarged sectional view taken substantially on plane 8—8, Fig. 7, Fig. 9 is a view similar to Fig. 7, but showing the ejector mechanism in ejecting position; Fig. 10 is an end view of one of the selector bails and selector bars and ejector mechanism associated therewith, Fig. 11 is an enlarged perspective view of one of the ejector arms, Fig. 12 is an enlarged sectional view showing the gearing connection between the selector bails and ejector arms, Fig. 13 is an enlarged perspective view of the locking mechanism guide plate, Fig. 14 is an enlarged perspective view of a locking mechanism controlling rod, Fig. 15 is an enlarged perspective view of a detent bar; Fig. 16 is an enlarged perspective view of a trip lever, Fig. 17 is an enlarged sectional view taken substantially on plane 17—17, Fig. 7, Fig. 18 is an enlarged sectional view taken on plane 18—18, Fig. 17, Fig. 19 is a perspective view of a slide block forming part of the re-setting mechanism, and Fig. 20 is a sectional view on plane 20—20, Fig. 8.

The supporting framework for the various mechanisms of the machine comprises a base 1 and the skeleton front and rear walls 2 and 3. A wall 4 supporting the keyboard housing 5 is mounted on the right end of the base 1 and is secured to the corresponding ends of the front and rear walls 2 and 3, the key-board being raised sufficiently above the base 1 in order that an accounting machine A may be inserted below it. The wall 4 has the opening 6 through which extend the various selector bars 7 of the coin paying mechanism to be controlled by keys 8 mounted on the key-board 9 supported by the housing 5 (Fig. 5).

The adding or accounting machine arranged below the structure 5 requires no special construction but may be an ordinary adding machine comprising a key-board 10, printing and tabulating equipment 11, and keys 12. When any of the keys 8 on the paying machine key-board 9 are depressed the corresponding adding machine keys 12 will also be depressed and the adding machine parts will be actuated in the same manner just as though the keys were depressed during ordinary use of the machine. The keys 8 of the paying machine like those of the adding machine are arranged in nine rows, nine deep. Of the four rows at the right designated B (Figs. 1 to 5), the first row represents from one cent to nine cents; the second row from ten cents to ninety cents; the third row from one dollar to nine dollars; and the fourth row from ten dollars to ninety dollars. The remaining five rows, designated C, are employed for effecting identification, printing and tabulating, as for example identifying workmen, jobs, etc. The various keys extend through and are guided at the top by the board 9, and at their lower ends extend through and are guided by the plate 13 supported on bars 14 extending across the housing 5, as clearly shown in Fig. 5.

The various selector bars 7 are supported on edge in slotted cross bars 15, 15 extending between the front and rear walls 2 and 3 and at their right ends extend through opening 6 into the key-board housing 5 and are then pivoted as shown at 16, 16 to latch bars 17 arranged within the structure 5 above the cross supports 14, one of the latch bars being associated with each of the keys of the group B. As shown, the outer end of each latch bar has a hook extension 18 which, when the bar is depresed, is brought in front of a transverse bail 19 carried by the web 20 extending upwardly from shaft 21 journaled in the front and rear walls of the housing 5. Each latch bar has an upwardly extending web 22 provided with a longitudinal slot 23 which receives the stud or pin 24 extending from the key 8 with which the bar is associated. The keys are normally held upwardly by spring mechanism (not shown) acting on the keys 12 of the adding machine, and upon depression of a key 8 the corresponding latch bar is depressed to carry its end 18 in front of the bail 19. The shaft 21 has a crank arm 25 extending therefrom to the exterior of housing 5 (Figs. 5 and 6), and this arm is connected by a link 26 with the main actuating lever mechanism 27 of the adding machine A in such manner that when this lever is swung forwardly the arm 25 will be swung downwardly to rotate shaft 21 to swing the bail 19 toward the right, the depressed latch bars and the selector bars 7 connected therewith being then shifted toward the right. Each of the selector bars is provided with one or more actuating lugs 28 which extend downwardly therefrom to coöperate with coin ejector mechanism which will be described later, the number and the spacing of the lugs depending upon the key with which the bar is associated. When the main actuating lever of the adding machine has been swung back to normal position after actuation of the machine the keys 12 will be restored to their upper position and will carry with them the keys 8 and the latch bars associated therewith.

Arranged transversely of the machine and trunnioned in the front and rear walls 2 and 3 are the webs or bails 29 which extend upwardly into the path of the lugs 28 secured to the selector bars 7, the lugs being to the left of the bails in order that when the bars are shifted toward the right the bails will be swung in clockwise direction. Adjacent the front wall 2 the under edges of the bails are notched as indicated at 30 (Figs. 7, 9 and 12) to receive a shaft 31 extending longitudinally and journaled at its ends and at intermediate points in suitable brackets 32 extending rearwardly from the front wall 2. Directly to the left of each bail a hub 33 is journaled on the shaft 31 and carries a bevel gear 34 which meshes with a bevel gear 35 secured to the bail concentric with its trunnion axis. Extending downwardly from each hub 33 is an arm 36 having a bearing head 37 at its lower end engaging in a slot 38 provided in a coin ejector bar 39 extending transversely of the machine. The arrangement is such that when a selector bar is shifted toward the right its abutment lug will coöperate with the corresponding bail to swing the bail toward the right to thereby rotate gears 35 and 34 and hub 33 to swing the associated arm 36 forwardly thereby to shift the corresponding selector bar forwardly to eject a coin from a coin magazine to be described later.

Each ejector bar is supported at its front and rear on rollers 40 and 41 journaled in frames 42 and 43 respectively, the frame 43 housing an upper roller 44 for engaging the upper side of the ejector bar to hold it to the rollers 40 and 41 (Figs. 4, 7 and 9). As best shown in Figs. 8 and 18, each ejector bar has at its front end a longitudinal vertical slot 45 at the rear end of which is pivoted an ejector arm 46 whose front end has the upwardly projecting ejecting finger 47. The front of each ejector arm has a cam slot 48 (Fig. 11) and the sides of the ejector bar have cam slots 49, a cam pin 50 extending through the slots. The shape and direction of the slots is such that when the cam pin is shifted forwardly the arm 46 will be raised to bring the ejecting finger 47 above the top surface of the supporting bar, and when the pin is shifted toward the rear of the slots the arm will be swung downwardly to carry the ejecting finger below the top of the ejector bar. As will be described presently, the ejector finger of each ejector bar travels through a slot provided in the base of the coin magazine, the finger being up during forward travel of the bar in order to engage with and to discharge a coin from the magazine, the cam pin after such ejection being shifted rearwardly to then drop the arm and finger in order that the ejector bar may be returned rearwardly free of the coins in the magazine. On the bearing frame 42 of each ejector bar abutments 51 are provided against which the ends of the respective cam pins abut when the ejector bar is restored to its inner position, and the pins being thus held during the final rearward movement of the selector bars, the ejector arm 46 will be raised and its ejector finger projected below the top of the ejector bar to be ready for the next forward movement of the ejector bar.

Adjacent each selector bar front and rear guide blocks 52 and 53 are secured to the base 1 of the machine and slidable in such blocks is a rod 54 having up-standing front and rear abutment fingers 55 and 56 between which pins 57 extend from the adjacent selector bar. At its front end each rod carries a ratchet arm 58 for coöperating with counter mechanism to be described later. During each forward shift of a selector bar the pin 57 thereon strikes the finger 55 on the associated rod 54 and this rod is shifted forwardly to effect actuation of the associated counter mechanism. When the selector bar is restored to its rear position the pin 57 strikes the rear finger 56 on the rod 54 and the rod is restored to its normal position. A spring 59 presses on each rod 54 to yieldingly hold the rod in its front and rear positions, the spring being mounted on the associated guide block 52 as clearly shown in Fig. 8.

The counter mechanism just referred to is mounted on a shelf 60 extending forwardly from the base 1 of the machine, a shaft 61 mounting the various counter structures 62, the unit wheels $a$ having a ratchet wheel $b$, with which the end of arm 58 of the associated actuating rod 54 coöperates. Supported on the shelf 60 above the counter is the plate 63, (Fig. 17) on which the coin magazine structure D is mounted, this plate having the transverse slots 64 through which the ejector arms 46 drop during rearward travel of the selector bars, these selector bars traveling across the top of the plate 63 (Figs. 7 and 9). A front plate 65 is secured to the supporting plate and has the sight openings 66 for the various counter structures.

The coin magazine comprises a base 67, a top 68 and sides 69. Between the base and top extends the vertical cylindrical coin holders 70 of different diameters corresponding to the diameters of the coins to be obtained. As shown, each coin magazine has a longitudinal slot 71 at its front side, and is surrounded by a sleeve 72 having sight apertures 73 adapted upon rotation of the sleeve to be brought into register with the slot 71 so that the coins within the magazine are visible. Below the base 67 of the coin holder structure is a plate 74 having openings 75 registering with the various coin magazines or cylinders and below the openings are the pockets or passageways 76 leading to the front of the machine. The plate 74 rests on a series of blocks 77 secured to the plate, these blocks being separated to provide ejector passageways 78 for the ejector bars. Secured to the front ends of the blocks is a plate 79 which holds the blocks in proper alinement. The coin magazine structure rests on the plate 64 with its ejector passageways 78 in registration with the respective slots 64 in plate 63 (Figs. 17 and 18) and the structure rests against the front wall 2 of the machine and is detachably held thereto by screws 80 extending through the upstanding lugs 81 on the front wall 2 (Fig. 7).

Spanning the front of each block 77 behind the plate 79 is a U-shaped piece 82 whose ends $e$ extend a distance into the ejector passageways 78 as clearly shown in Figs. 17 and 18. The ends at the front end of each ejector passageway 78 are in the path of the cam pins 50 on the corresponding ejector bar 39 and when an ejector bar reaches the front end of its passageway, the pin ends, during the last part of the movement of the ejector bar, abut against the ends $e$ with the result that the ejector plate 46 is forced downwardly to bring its ejector finger 47 below the top of the ejector bar, such depressed position of the ejector bar being retained until, as before described, the cam pin reaches the abutments 51. Then during the last part of the rearward movement of the ejector bar the cam pin cams the ejector arm upwardly to restore the ejector finger to its upper position ready for the next coin ejection. In Fig. 7 the ejector bar is shown in its normal position, the ejector finger 47 being up. The stacks of coins in the coin chutes rest on the blocks 77 above the ejector bar passageways 78 and as the ejector bar is shifted forwardly the ejecting finger engages with the rear edge of the lowermost coin and forces the coin outwardly through the passageway 76, the coin being fully ejected and falling from the machine before the cam pin 50 reaches the abutment ends $e$. Then during the last part of the forward movement of the ejector bar the cam pin is stopped and its camming action in the ejector bar and in the ejector arm will cause the ejector arm to swing downwardly. Then during rearward movement of the ejector bar the ejector finger 47 will be within the ejector bar and below the coin stack, to be returned to its upper position when the ejector bar reaches its normal position. As the top of the ejector bar is a distance below the tops of the blocks 77 over which the coins are ejected, the ejector bar can be freely restored without dragging the ejector finger across the bottom coin of the stack, and furthermore the stack above the ejected coin can, immediately upon ejection of a coin, drop to bring the then lowermost coin against the blocks 77.

Upon forward pull on the main operating lever 27 of the machine the various selected selector bars are drawn to the right and the corresponding ejector bars are shifted outwardly to eject coins from the corresponding coin chutes. All this mechanism must then be restored to normal, and for this purpose restoring mechanism is provided which is actuated upon rearward swing of the main operating lever. Referring to Figs. 3, 4, 5 and 6, a restoring bar 83 is disposed in front of the selector bars and parallel therewith and slidable in slotted cross bars 15. This restoring bar is connected by a link 84 with a connecting bar 85 which is pivoted to the crank arm 86 at the end of the rock shaft 21 from which extends the bail 20 for coöperating with the selector latch bars 17. When the main operating lever of the machine is drawn forwardly and the selected latch bars and selector bars are drawn to the right, the crank arm 86 will swing and will draw the restoring bar 83 toward the right. During movement to the right of the selector bars the abutments 28 thereon will swing the bails 29 toward the right. On the restoring bar are abutments 87 (Figs. 3 and 4), these abutments being to the right of the bails and adapted to engage therewith when the restoring bar is restored to the left when the main operating lever is swung rearwardly to normal position. Thus when the main operating lever is swung forwardly the selected bails will be swung toward the right, and when the restoring lever is swung back to normal position the restoring bar will be shifted inwardly to restore the bails to normal position, and the actuated selector bars will be carried with the bails back to normal position. After such restoration of the selector bars the adding machine keys and the paying machine selector keys will be raised to normal position and will carry the latch bars 17 upwardly to normal position.

It may happen that one of the coin chutes may become empty unbeknown to the operator, in which case any setup amount which will require the ejection of a coin from the empty compartment would result in shortage in the coins delivered. Means are therefore provided for automatically locking the machine against operation in such cases, such operation giving warning to the operator who must place coins in the empty compartment before he can proceed. Such locking mechanism is best shown in Figs. 4, 9, 10, 13, 14, 15, 16, 17 and 18. Mounted on the front wall 2 in front of the restoring bar 83 is a plate 88 having sets of guide notches 89 and 90 in its front and rear edges. Associated with each set of notches is a detent bar 91 which engages on the front notches and whose end *f* is bent into U-shape to provide a downwardly extending detent tongue 92 which engages in the rear notch 90. A set of notches is associated with each bail and the inner notch of each set is a short distance to the right of the bail end when the bail is in its normal position (Fig. 4). Normally the detent structures 91 are down with their tongues 92 to the right of the bail ends to lock the bails against swing. In each coin ejector bar passageway 78 a trip lever 93 is pivoted at its front end to one side of the passageways and the front end of each lever has an up-standing point 94 extending through a slot 95 provided in the respective block 77. The rear end of each trip lever extends below the corresponding detent bar 91, and the weights of the bars will hold the rear ends of the trip levers down in order that the lever points 94 will project upwardly into the coin ejector passageways 78 above the blocks 77 (Fig. 7). If there are coins in the chutes from which ejection is attempted the lowermost coin will, immediately upon ejection movement, encounter the protruding point of the trip lever and will, in traveling over the point, oscillate the lever to swing its rear end upwardly to raise the detent bar 91 and to raise the detent tongue 92 above the path of the bail, the bail being then free to swing to effect complete ejection movement of the ejector bar and ejection of the coin (Figs. 9 and 10). As shown in Fig. 4, the detent tongues 92 are normally sufficiently distant from the bails to allow enough swing of the bails to effect forward movement of the ejector bars a sufficient distance to shove the coins over the trip lever points. Suppose, however, that a selection is made involving an ejector bar associated with an empty magazine. There being no coin to be ejected upon forward movement of the selector bar associated with the empty chute, the corresponding trip lever will not be rotated and the associated detent bar will remain down and its tongue held in advance of the associated bail (Figs. 4 and 7). Therefore, after the selected bails have been swung a distance and the associated selector bars shifted forwardly a short distance, the bail associated with the empty chute will be locked against further movement and the connected selector bar is also locked, thus locking the latch bar bail 19 and preventing further movement of the main operating lever. This locking immediately gives warning to the operator who will then discover the empty coin chute. The operator then restores the main operating lever and replenishes the empty chute whereupon the machine can again be operated.

At certain times it will be necessary to unlock the selector mechanisms for operation when the coin magazines are empty, as for example when the operator desires to determine the number of coins of each denomination necessary for paying off a payroll. Such unlocking is accomplished by means of a rod 96 journaled on top of the guide plate 88 and having its outer end provided with an actuating member such as a knurled head 97 (Figs. 1 and 2). This rod has cam pins 98 extending therefrom. Normally the rod is adjusted so that the pins extend horizontally, but when it is desired to release the selector mechanisms for operation when the coin chutes are empty the rod is turned to swing the pins to vertical position, such movement causing the pins to engage with the bends of the detent structure 91 to raise the detent tongues 92 above the paths of the bails. The bails being thus unlocked the machine can be operated when the coin magazine is empty, setting up on the key-board 9 of the pay roll items and actuation of the main operating lever causing then forward shifting of selected ejector bars and operation of the rods 54 which coöperate with the counter mechanisms 62. After entering the items of the pay-roll each counter mechanism will indicate the numbers of coins necessary for the respective coin chutes. After the determination of the number of coins necessary the coin chutes can be filled accordingly and the unlocking bar 96 is rotated to release the detents 91 and the machine can then be used for ejecting coins. However, before ejection, the counter mechanisms are re-set to zero and will then respond to each coin ejection and will act as a check.

Any suitable mechanism can be provided for resetting the counter mechanisms. Referring to Figs. 7, 8, 9 and 17, the various numeral wheels of the counter structures 62 are journaled on the shaft 61 between the bearing plates 100 to which the shaft journals. The wheels of each group being held against one of the bearing plates by a spring 101 abutting against the wheels and the adjacent bearing plate. The wheels of each mechanism are connected by any well known suitable carry-over mechanism (not shown) in order that the rotation of the units wheel will be transferred to the wheels of the higher decimal orders in the well known manner. Each wheel has a pin 102 extending therefrom and to the rear of the walls is mounted a rotatable rod 103 having a detent web 104 extending radially therefrom which extends vertically when the machine is in operation and which is adapted by rotation of the rod 103 to be carried into horizontal position to extend into the path of the pins 102 on the counter wheels to serve as an alining abutment for the wheels during the resetting operation.

The left outer end of the shaft 61 extends into the hollow stem 105 having the knurled head 106 at its outer end and terminating at its inner end in the disk 107. Between the disk 107 and the first counter wheel a spring 108 encircles the shaft 61 and tends to hold the disk away from the wheel against a locking plate 109, this locking plate having a pin 110 adapted to engage in the hole 112 in the disk 107 to lock the stem and disk against rotation. When the stem is shoved inwardly the pin and hole are disengaged and the stem can be turned to effect rotation of the shaft 61 and resetting of the counter mechanism. Normally, that is, during operation of the machine, the alining web 104 extends vertically to allow free rotation of the counter wheels. Provision is however made to automatically rotate the rod 103 to bring the alining web into horizontal position into the path of the counter wheel pins in order that when the shaft 61 is turned during the resetting operation the counter wheels will rotate until their pins all abut against the alining web, the wheels being then all at zero indication. Provision is also made to automatically restore the alining web to vertical position after the resetting operation. As best shown in Figs. 17, 19 and 20, a slide block 113 is adapted to reciprocate in the transverse groove 114 in the shelf 60. Extending toward the left from the rear end of this block is a pin 115 engaged by the crank plate 116 on the alining rod 103. The disk 107 is notched at its periphery to provide a notch 117 and a tooth 118. The front end of a shoulder 119 on the block 113 normally engages in this notch 117 and behind the tooth 118. With this arrangement when the disk 107 is shoved inwardly to release it from the locking disk 109, and is then turned, the tooth 118 by engaging against the shoulder 119 will shift the block 113 rearwardly and the pin 115 coöperating with crank 116 will rotate the rod 103 to bring the alining web 104 forwardly into horizontal position into the path of the counter wheel pins. Upon further turning then of the disk the counter wheels are rotated and reset to zero position. The spring 120 acts against the rear end of the block 113 and tends to shift this block forwardly. However, after shifting of the block 113 rearwardly the cylindrical periphery of the disk 107 will be in front of the shoulder 119 and will prevent restoration of the rod until the disk has made a complete revolution and the notch 117 again reaches the shoulder 119. At the end of a complete revolution of the disk 107 the counter wheels will have been set to zero and the block 113 will be freed and will be shifted forwardly by the spring 120 to reëngage with shoulder 119 in the notch 117 and such forward movement of the block will effect rotation of the rod 103 to bring its alining web into vertical position. In order that the alining rod 103 may be shifted directly it may be provided with a crank lever 121.

In making up certain amounts several coins of one denomination may be necessary. At such coin magazine compartments from which it is desired to eject more than one coin at each operation, the height of the ejector passageways 76 is increased and the heights of the associated ejector fingers 47 are correspondingly increased. For example, in the machine shown provision is made to eject two coins at each operation from two of the one dollar compartments, two of the twenty-dollar compartments, and two of the one-cent compartments.

A very efficient machine is thus provided which has very desirable characteristics. The mechanisms are designed to respond quickly and efficiently and with the least resistance, friction being reduced to a minimum. The ejector fingers being down during rearward movement of the selector bars, the weight of the coins is entirely removed therefrom. Error in ejection is also prevented as the machine becomes automatically locked as soon as attempt is made to eject from an empty magazine compartment. The machine can be readily set and unlocked to allow operation of the counter mechanisms to determine the number of coins of the different denominations necessary for meeting a certain pay-roll. After an operation the counter mechanisms may be very readily restored to zero indication. By releasing the connecting link between the paying machine key-board and the main operating lever of the adding machine, the adding machine can be removed and used in its ordinary capacity.

We do not of course desire to be limited to the precise structures and arrangements shown and described as changes are no doubt possible which would still come within the scope of the invention, and the following is claimed:

1. In a machine of the class described, the combination of a holder for coins, an ejector bar and an ejector member mounted thereon, means for reciprocating said bar below said holder and coins therein, slots in said bar and ejector member respectively, a pin passing through said slots, and front and rear abutments in the path of said pin as the bar is reciprocated, the slot in said ejector member being inclined and said pin when engaging with the front abutment coöperating with said slot to depress the ejector member below the lowermost coin in the holder and when engaging with the rear abutment coöperating with the slot to raise the ejector member into the plane of the lowermost coin.

2. In a machine of the class described, the combination of a holder for coins, an ejector bar and an ejector member mounted thereon, means for reciprocating said bar below said holder said bar and said member having slots, a pin passing through said slots and projecting beyond the sides of said bar, front and rear abutments for said pin and in the path of said bar, the slots in said bar being inclined and said pin when engaging with said front abutment coöperating with said bar slots to depress the ejector member below the plane of the lowermost coin in the holder and when engaging with the rear abutment coöperating with said bar slots to again raise the ejector member.

3. In a machine of the class described, the combination of a holder for coins, an ejector bar and an ejector member mounted thereon, means for reciprocating said bar below said holder and coins therein, said bar having a slot, a pin extending through said ejector member and said slot and projecting beyond the side of said bar, front and rear abutments for said pin, said slot being inclined and said pin when engaging with the front abutment coöperating with said slot to depress the ejector member below the plane of the lowermost coin and said pin when engaging with the rear abutment coöperating with said slot to restore the member to upper position.

4. In a machine of the class described, the combination of a holder for coins, an ejector bar and an ejector member mounted thereon, means for reciprocating said bar below said holder and coins therein, said ejector member having a slot, a pin extending through said slot and bar and projecting beyond the side of said bar, front and rear abutments for said pin, said slot being inclined and said pin when engaging with the front abutment coöperating with said slot to depress the ejector member below the plane of the lowermost coin and said pin when engaging with the rear abutment coöperating with said slot to restore the member to upper position.

5. In a machine of the class described, the combination of a holder for coins, an ejector bar having a forked outer end, means for reciprocating said bar below the holder and coins therein, an ejector member within the fork of the bar pivoted at its inner end to the bar, a pin passing transversely through said bar and ejector member, front and rear abutments for said pin adjacent the path of said bar, said bar and member having cam surfaces adapted to coöperate with said pin to swing the member downwardly below the lowermost coin in the holder when said pin engages the front abutment and to coöperate with the pin to raise the member into the plane of the lowermost coin when the pin engages with the rear abutment.

6. In a machine of the class described, the combination of a holder for coins, an ejector bar and an ejector member mounted thereon, means for reciprocating said bar below said holder, said bar and said member having cam slots, a cam pin passing through said slots, and outer and inner abutments for said pin, coöperation of said pin with said inner abutment causing engagement of the pin with the cam slots to raise the ejecting member to ejecting position whereby a coin will be ejected during outward shift of the bar and coöperation of the pin with the outer abutment causing coöperation of the pin with the cam slots to drop the member to prevent engagement thereof with coins during rearward movement of the bar.

7. In a machine of the class described, the combination of a coin holder, ejector mechanism associated with said holder, actuating mechanism for said ejector mechanism, detent means normally in position to lock the actuating mechanism against complete operation, and means controlled by a partially ejected coin for releasing said detent mechanism.

8. In a machine of the class described, the combination of a coin holder, ejector mechanism associated therewith, actuating mechanism for said ejector mechanism, detent mechanism normally in the path of the actuating mechanism to prevent complete operation thereof, and releasing mechanism for said detent mechanism disposed in the path of coins ejected from said holder.

9. In a machine of the class described, the combination of a coin holder, ejector mechanism associated therewith, actuating mechanism for said ejector mechanism, detent mechanism normally in the path of the actuating mechanism to prevent complete operation thereof, and a trip lever disposed to be actuated by a partially ejected coin to release the detent mechanism to allow complete operation of the actuating mechanism and complete ejection of the coin.

10. In a machine of the class described, the combination of a plurality of coin holders, ejector mechanism associated with each coin holder, actuating mechanism for each ejector mechanism, detent mechanism associated with each actuating mechanism to normally lock said actuating mechanism against complete operation, and releasing mechanism for each detent mechanism, each releasing mechanism being associated with the corresponding coin holder and controlled by the partial ejection of a coin to actuate the associated detent mechanism to release the respective actuating mechanism for complete actuation.

11. In a machine of the class described, the combination of a plurality of coin holders, ejector mechanism associated with each coin holder, an actuating train for each ejector mechanism, a common actuating means for said actuating trains, detent mechanism associated with each actuating train and normally in position to lock the train against complete operation, releasing mechanism for each detent mechanism, each releasing mechanism depending for operation upon the partial ejection of a coin of the associated coin holder.

12. In a machine of the class described, the combination of a plurality of coin holders, ejector mechanism associated with each coin holder, an actuating train for each ejector mechanism, common actuating mechanism for said actuating trains, means for selectively connecting actuating trains with said actuating mechanism, detent mechanism associated with each actuating train and normally locking the train and thereby the actuating means against complete operation, releasing mechanism for each detent mechanism, each releasing mechanism depending for its operation on the partial ejection of a coin from the associated coin holder whereby all the selected trains and the common actuating mechanism will be released to allow ejecting movement of the corresponding ejector mechanisms if the associated coin holders have coins therein and whereby the common actuating mechanism will prevent it from complete operation if any one of the associated coin holders is empty.

13. In a machine of the class described, the combination of a plurality of coin holders, ejector mechanism associated with each coin holder, an actuating train for each ejector mechanism, common actuating mechanism for said actuating trains, means for selectively connecting actuating trains with said actuating mechanism, detent mechanism associated with each actuating train and normally locking the train and thereby the actuating means against complete operation, releasing mechanism for each detent mechanism, each releasing mechanism depending for its operation on the partial ejection of a coin from the associated coin holder whereby all the selected trains and the common actuating mechanism will be released to allow ejecting movement of the corresponding ejector mechanisms if the associated coin holders have coins therein and whereby the common actuating mechanism will prevent it from complete operation if any one of the associated coin holders is empty, and means independent of said individual releasing mechanisms for actuating all of the detent mechanisms to release the actuating trains whereby the trains and actuating mechanism may be actuated independently of the coin holders.

14. In a machine of the class described, the combination of a coin holder, ejector mechanism associated therewith, counter mechanism and actuating means therefor, actuating mechanism for simultaneously actuating said ejector mechanism and counter actuating mechanism, detent mechanism normally in position to prevent operation of the actuating mechanism, releasing mechanism for the detent mechanism controlled by the partial ejection of a coin whereby said actuating mechanism will remain locked if there are no coins in the holder, and auxiliary releasing means for the detent mechanism for controlling the un-locking of said actuating mechanism independently of the condition of the coin holder.

15. In a machine of the class described, the combination of a coin holder, ejector mechanism associated therewith, actuating mechanism for said ejector mechanism, detent mechanism normally in the path of the actuating mechanism to prevent operation thereof, and a trip lever for said detent mechanism, said trip lever being in the ejecting path of coins from said holder to be actuated to trip the detent mechanism and to release the actuating mechanism for ejecting operation.

16. In a machine of the class described, the combination of a coin holder, ejector mechanism associated therewith, actuating mechanism for said ejector mechanism, detent mechanism normally preventing complete operation of the actuating mechanism, a trip lever for said detent mechanism pivoted below the coin holder with its outer end normally projecting into the coin ejecting path to be engaged by the lowermost coin during its initial ejecting movement whereby to swing said trip lever to effect actuation of the detent mechanism to release the actuating mechanism for complete operation and ejecting of the ejector mechanism.

17. In a machine of the class described, the combination of a coin holder, ejector mechanism associated therewith, actuating mechanism for said ejector mechanism, detent mechanism normally preventing complete operation of the actuating mechanism, a trip lever for said detent mechanism pivoted below the coin holder with its outer end normally projecting into the coin ejecting path to be engaged by the lowermost coin during its initial ejecting movement whereby to swing said trip lever to effect actuation of the detent mechanism to release the actuating mechanism for complete operation and ejecting of the ejector mechanism, and means for releasing the detent mechanism independently of said trip lever.

18. In a machine of the class described, the combination of a coin holder, an ejector bar adapted to reciprocate below said coin holder, an actuating arm for said ejector bar adapted to swing in the plane thereof, a bevel gear secured to said arm, a shaft and a gear thereon for meshing with said arm gear to swing the arm when the shaft is rotated, means for rotating said shaft, a bail on said shaft, and a bar adapted to be reciprocated to coöperate with said bail to rotate said shaft.

19. In a machine of the class described, the combination of a row of coin holders, an ejector bar reciprocable under each holder, a shaft above said bars, an actuating arm for each bar, said arms being pivoted on said shaft, a bevel gear secured to each arm, a bail structure adjacent each arm and a bevel gear thereon for meshing with the gear on said arm, and means for selectively actuating said bails to effect swing of the corresponding arm and reciprocation of the associated ejector bar.

20. In a machine of the class described, the combination of a row of coin holders, an ejector bar reciprocable under each holder, a shaft above said bars, an actuating arm for each bar, said arms being pivoted on said shaft, a bevel gear secured to each arm, a bail structure adjacent each arm and a bevel gear thereon for meshing with the gear on said arm, means for selectively actuating said bails to effect swing of the corresponding arm and reciprocation of the associated ejector bar, a detent member for each bail normally preventing complete operation thereof, and a trip lever for each detent member projected into the ejecting path of the associated holder to be actuated to trip the detent member to release the bail for complete operation.

In witness whereof, we hereunto subscribe our names this 3rd day of Nov., A. D. 1914.

NELSON C. OVAITT.
FREDRICK N. ROSENSTENGEL.

Witnesses:
WM. J. BELKNAP,
JAMES P. BARRY.